US011296763B2

(12) United States Patent
Zhu et al.

(10) Patent No.: US 11,296,763 B2
(45) Date of Patent: Apr. 5, 2022

(54) DETERMINING INFORMATION CORRESPONDING TO BEAMFORMING

(71) Applicant: Lenovo (Beijing) Limited, Beijing (CN)

(72) Inventors: Chenxi Zhu, Beijing (CN); Tyler Brown, Lake Zurich, IL (US); Bingchao Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 38 days.

(21) Appl. No.: 16/759,695

(22) PCT Filed: Oct. 26, 2017

(86) PCT No.: PCT/CN2017/107838
§ 371 (c)(1),
(2) Date: Apr. 27, 2020

(87) PCT Pub. No.: WO2019/080054
PCT Pub. Date: May 2, 2019

(65) Prior Publication Data
US 2020/0343950 A1    Oct. 29, 2020

(51) Int. Cl.
*H04B 7/06* (2006.01)
*H04L 5/00* (2006.01)
*H04W 72/04* (2009.01)

(52) U.S. Cl.
CPC .......... *H04B 7/0617* (2013.01); *H04L 5/005* (2013.01); *H04W 72/0413* (2013.01)

(58) Field of Classification Search
CPC ....... H04B 7/0617; H04B 7/061; H04L 5/005; H04W 72/0413; H04W 72/046
See application file for complete search history.

(56) References Cited

U.S. PATENT DOCUMENTS

2013/0301454 A1    11/2013  Seol et al.
2020/0083939 A1*   3/2020   Park .................. H04W 72/1268

OTHER PUBLICATIONS

What Is The Difference Between Beamforming and Precoding? by Emil Bjornson (Year: 2017).*
Lenovo, Motorola Mobility, 3GPP TSG RAN WG1 Meeting #89 R1-1707764, May 15-19, 2017, pp. 1-6.
International Application No. PCT/CN2017/107838, "Notification of Transmittal of the International Search Report and the Written Opinion of the International Searching Authority, or the Declaration" dated Jul. 31, 2018, pp. 1-9.

(Continued)

*Primary Examiner* — Thai Nguyen
(74) *Attorney, Agent, or Firm* — Kunzler Bean & Adamson

(57) ABSTRACT

Apparatuses, methods, and systems are disclosed for determining information corresponding to beamforming. One method (1400) includes determining (1402) a grouping arrangement corresponding to a type of beamforming. The type of beamforming includes analog beamforming, digital beamforming, hybrid beamforming, or some combination thereof. The method (1400) includes determining (1404) a set of information corresponding to the grouping arrangement. The set of information includes the type of beamforming. The method (1400) includes transmitting (1406) the set of information to a base unit.

19 Claims, 11 Drawing Sheets

(56) References Cited

OTHER PUBLICATIONS

Vivo, "Discussion on Codebook Based UL Transmission", 3GPP TSG RAN WG1 NR Ad Hoc #3 R1-1715612, Sep. 18-21, 2017, pp. 1-5.
LG Electonics, "Discussion on non-codebook based transmission for UL", 3GPP TSG RAN WG1 Meeting #90 R1-1713137, Aug. 21-25, 2017, pp. 1-5.
Vivo, "Discussion on Non-codebook Based UL Transmission", 3GPP TSG RAN WG1 NR Ad Hoc #3 R1-1715613, Sep. 18-21, 2017, pp. 1-4.
Qualcomm Incorporated, "Non-Codebook Based UL Transmission", 3GPP Tsg Ran WG1 Nr Ad-Hoc #3 R1-1716389, Sep. 18 -21, 2017, pp. 1-4.
Huawei, Hilsilcon, "Non-codebook based transmission for UL MIMO", 3GPP TSG RAN WG1 Meeting #90 R1-1712229, Aug. 21-25, 2017, pp. 1-8.
Intel Corporation, "On non-codebook Based UL Transmission", 3GPP TSG RAN WG1 Meeting #90 R1-1712538, Aug. 21-25, 2017, pp. 1-5.
Ericsson, "UL MIMO for non-codebook based transmission", 3GPP TSG-RAN WG1 NR Ad Hoc #3 R1-1716342, Sep. 18-21, 2017, pp. 1-5.

\* cited by examiner

DETERMINING INFORMATION CORRESPONDING TO BEAMFORMING

FIELD

The subject matter disclosed herein relates generally to wireless communications and more particularly relates to determining information corresponding to beamforming.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Resource Element ("RE"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Scheduling Request Indicator ("SRI"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, beamforming may be used. In such networks, a variety of beamforming configurations may be used.

BRIEF SUMMARY

Methods for determining information corresponding to beamforming are disclosed. Apparatuses and systems also perform the functions of the method. In one embodiment, the method includes determining a grouping arrangement corresponding to a type of beamforming. In such an embodiment, the type of beamforming includes analog beamforming, digital beamforming, hybrid beamforming, or some combination thereof. In certain embodiments, the method includes determining a set of information corresponding to the grouping arrangement. In such embodiments, the set of information includes the type of beamforming. In some embodiments, the method includes transmitting the set of information to a base unit.

In one embodiment, the set of information includes a number of sounding reference signal resources, a number of sounding reference signal groups, or some combination thereof. In a further embodiment, the number of sounding reference signal resources is greater than zero, the number of sounding reference signal groups is greater than zero, or some combination thereof. In certain embodiments, the grouping arrangement is selected from a set including a first scheme and a second scheme. In various embodiments, the set of information for the first scheme includes a number of non-co-transmission groups. In some embodiments, the set of information for the first scheme includes, in response to the number of non-co-transmission groups being greater than zero, information that indicates sounding reference signal groups that belong to each non-co-transmission group of the non-co-transmission groups. In such embodiments, a base unit is limited to determining a maximum of one sounding reference signal resource from each non-co-transmission group for use.

In certain embodiments, the set of information for the first scheme includes, in response to the type of beamforming including analog beamforming, information that indicates at least one sounding reference signal group, each sounding reference signal group of the at least one sounding reference signal group includes sounding reference signal resources for a same antenna panel, and a base unit is limited to determining a maximum of one sounding reference signal resource from each sounding reference signal group. In some embodiments, the set of information for the first scheme includes, in response to the type of beamforming including digital beamforming, hybrid beamforming, or a combination thereof, information that indicates at least one sounding reference signal group, each sounding reference signal group of the at least one sounding reference signal group includes sounding reference signal resources for a same analog beam and a same antenna panel, and a base unit is configured to determine any number of sounding reference signal resources from each sounding reference signal group.

In various embodiments, the set of information for the second scheme includes a number of panels and a number of panel groups. In certain embodiments, the number of panels is greater than zero and the number of panel groups is greater than zero. In some embodiments, the set of information for the second scheme includes, in response to the type of beamforming including hybrid beamforming, information that indicates at least one sounding reference signal group, each sounding reference signal group of the at least one sounding reference signal group includes sounding reference signal resources for a same analog beam and a same antenna panel, and a base unit is configured to determine any number of sounding reference signal resources from each sounding reference signal group.

In certain embodiments, the set of information for the second scheme includes, in response to the type of beamforming including digital beamforming, information that indicates at least one sounding reference signal group, each sounding reference signal group of the at least one sounding reference signal group includes sounding reference signal resources for a same antenna panel, and a base unit is configured to determine any number of sounding reference signal resources from each sounding reference signal group. In various embodiments, the set of information for the second scheme includes information that indicates at least one sounding reference signal panel group, each sounding reference signal panel group of the at least one sounding reference signal panel group includes at least one sounding reference signal group, and a base unit is configured to determine a maximum number of one sounding reference signal group from the at least one sounding reference signal group of each sounding reference signal panel group. In some embodiments, the method includes receiving information that indicates a sounding reference signal port for uplink transmission. In such embodiments, the sounding reference signal port is determined based on the set of information.

In various embodiments, the method includes transmitting uplink data using the sounding reference signal port. In some embodiments, the method includes receiving information that indicates multiple sounding reference signal ports for uplink transmission. In such embodiments, the multiple sounding reference signal ports is determined based on the set of information. In certain embodiments, the method includes transmitting uplink data using the multiple sounding reference signal ports. In such embodiments, transmission power is shared by sounding reference signal ports from a same sounding reference signal group.

In one embodiment, the set of information corresponds to a codebook based uplink transmission scheme. In some embodiments, the set of information corresponds to a non-codebook based uplink transmission scheme.

An apparatus for determining information corresponding to beamforming, in one embodiment, includes a processor that: determines a grouping arrangement corresponding to a type of beamforming, wherein the type of beamforming includes analog beamforming, digital beamforming, hybrid beamforming, or some combination thereof; and determines a set of information corresponding to the grouping arrangement, wherein the set of information includes the type of beamforming. In some embodiments, the apparatus includes a transmitter that transmits the set of information to a base unit.

One method for receiving information corresponding to beamforming includes receiving a set of information from a remote unit. In such embodiments, the set of information includes a type of beamforming and corresponds to a grouping arrangement, and the type of beamforming includes analog beamforming, digital beamforming, hybrid beamforming, or some combination thereof.

In one embodiment, the set of information includes a number of sounding reference signal resources, a number of sounding reference signal groups, or some combination thereof. In a further embodiment, the number of sounding reference signal resources is greater than zero, the number of sounding reference signal groups is greater than zero, or some combination thereof. In certain embodiments, the grouping arrangement is selected from a set including a first scheme and a second scheme. In various embodiments, the set of information for the first scheme includes a number of non-co-transmission groups. In some embodiments, the set of information for the first scheme includes, in response to the number of non-co-transmission groups being greater than zero, information that indicates sounding reference signal groups that belong to each non-co-transmission group of the non-co-transmission groups. In one embodiment, the method includes determining a maximum of one sounding reference signal resource from each non-co-transmission group for use.

In certain embodiments, the set of information for the first scheme includes, in response to the type of beamforming including analog beamforming, information that indicates at least one sounding reference signal group, and each sounding reference signal group of the at least one sounding reference signal group includes sounding reference signal resources for a same antenna panel. In some embodiments, the method includes determining a maximum of one sounding reference signal resource from each sounding reference signal group. In various embodiments, the set of information for the first scheme includes, in response to the type of beamforming comprising digital beamforming, hybrid beamforming, or a combination thereof, information that indicates at least one sounding reference signal group, and each sounding reference signal group of the at least one sounding reference signal group includes sounding reference signal resources for a same analog beam and a same antenna panel. In certain embodiments, the method includes determining any number of sounding reference signal resources from each sounding reference signal group.

In various embodiments, the set of information for the second scheme includes a number of panels and a number of panel groups. In certain embodiments, the number of panels is greater than zero and the number of panel groups is greater than zero. In some embodiments, the set of information for the second scheme includes, in response to the type of beamforming including hybrid beamforming, information that indicates at least one sounding reference signal group, and each sounding reference signal group of the at least one sounding reference signal group includes sounding reference signal resources for a same analog beam and a same antenna panel. In one embodiment, the method includes determining any number of sounding reference signal resources from each sounding reference signal group.

In certain embodiments, the set of information for the second scheme includes, in response to the type of beamforming including digital beamforming, information that indicates at least one sounding reference signal group, and each sounding reference signal group of the at least one sounding reference signal group includes sounding reference signal resources for a same antenna panel. In some embodiments, the method includes determining any number of sounding reference signal resources from each sounding reference signal group. In various embodiments, the set of information for the second scheme includes information that indicates at least one sounding reference signal panel group, and each sounding reference signal panel group of the at least one sounding reference signal panel group includes at least one sounding reference signal group. In some embodiments, the method includes determining a maximum number of one sounding reference signal group from the at least one sounding reference signal group of each sounding reference signal panel group. In some embodiments, the method includes transmitting information that indicates a sounding reference signal port for uplink transmission.

In various embodiments, the sounding reference signal port is determined based on the set of information.

In various embodiments, the method includes receiving uplink data from the sounding reference signal port. In some embodiments, the method includes transmitting information that indicates multiple sounding reference signal ports for uplink transmission. In such embodiments, the multiple sounding reference signal ports is determined based on the set of information. In certain embodiments, the method includes receiving uplink data from the multiple sounding reference signal ports. In such embodiments, transmission power is shared by sounding reference signal ports from a same sounding reference signal group.

In one embodiment, the set of information corresponds to a codebook based uplink transmission scheme. In some embodiments, the set of information corresponds to a non-codebook based uplink transmission scheme.

An apparatus for receiving information corresponding to beamforming, in one embodiment, includes a receiver that receives a set of information from a remote unit. In various embodiments, the set of information includes a type of beamforming and corresponds to a grouping arrangement, and the type of beamforming includes analog beamforming, digital beamforming, hybrid beamforming, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered as limiting of scope, the embodiments will be described and explained with additional specificity and detail through the use of the accompanying drawings, in which.

DETAILED DESCRIPTION

Figure 1:
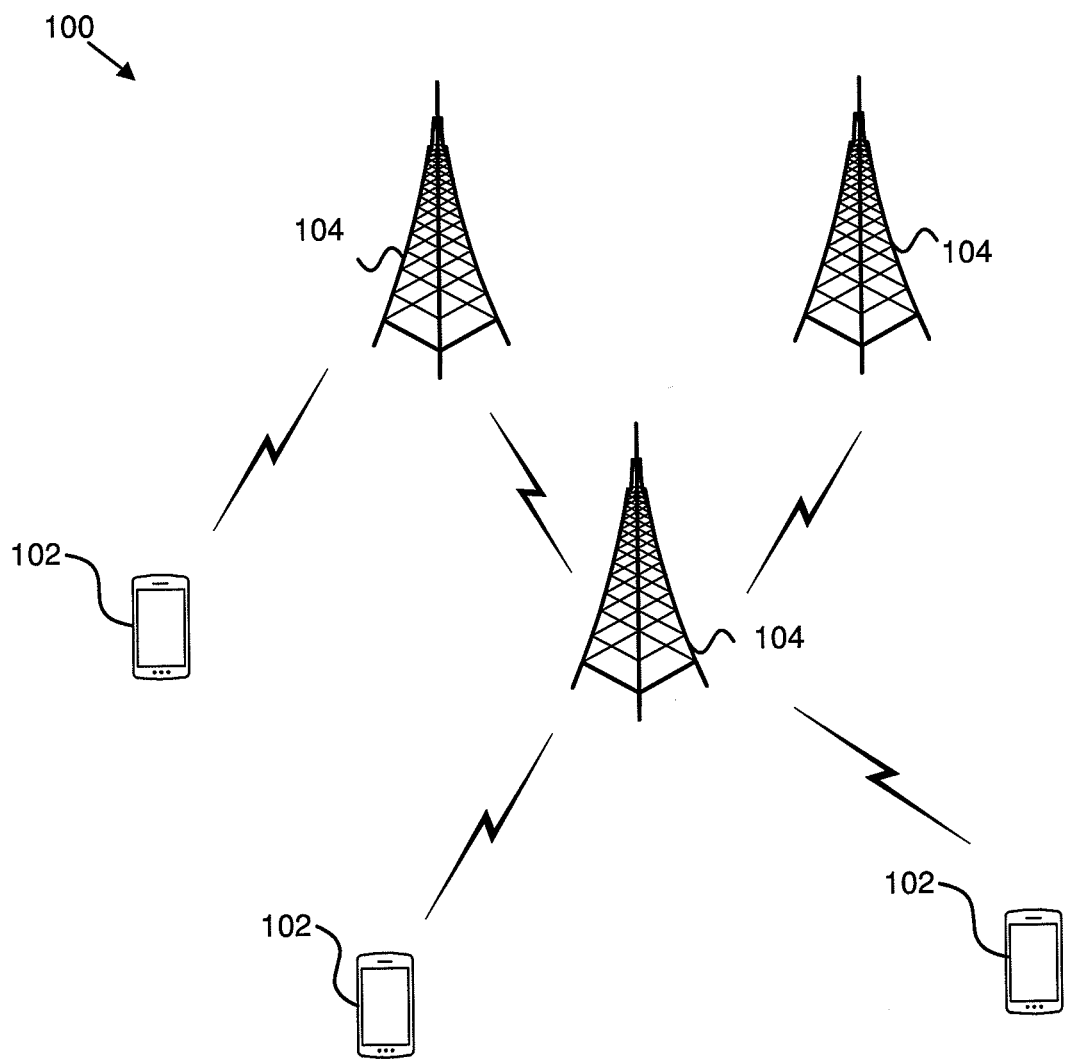
FIG. 1 is a schematic block diagram illustrating one embodiment of a wireless communication system for determining information corresponding to beamforming.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations is which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining information corresponding to beamforming. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a grouping arrangement corresponding to a type of beamforming. In such an embodiment, the type of beamforming includes analog beamforming, digital beamforming, hybrid beamforming, or some combination thereof. In certain embodiments, the remote unit 102 may determine a set of information corresponding to the grouping arrangement. In such embodiments, the set of information includes the type of beamforming. In some embodiments, the remote unit 102 may transmit the set of information to a base unit 104. Accordingly, a remote unit 102 may be used for determining information corresponding to beamforming.

In certain embodiments, a base unit 104 may receive a set of information from a remote unit 102. In such embodiments, the set of information includes a type of beamforming and corresponds to a grouping arrangement, and the type of beamforming includes analog beamforming, digital beamforming, hybrid beamforming, or some combination thereof. Accordingly, a base unit 104 may be used for receiving information corresponding to beamforming.

Figure 2:
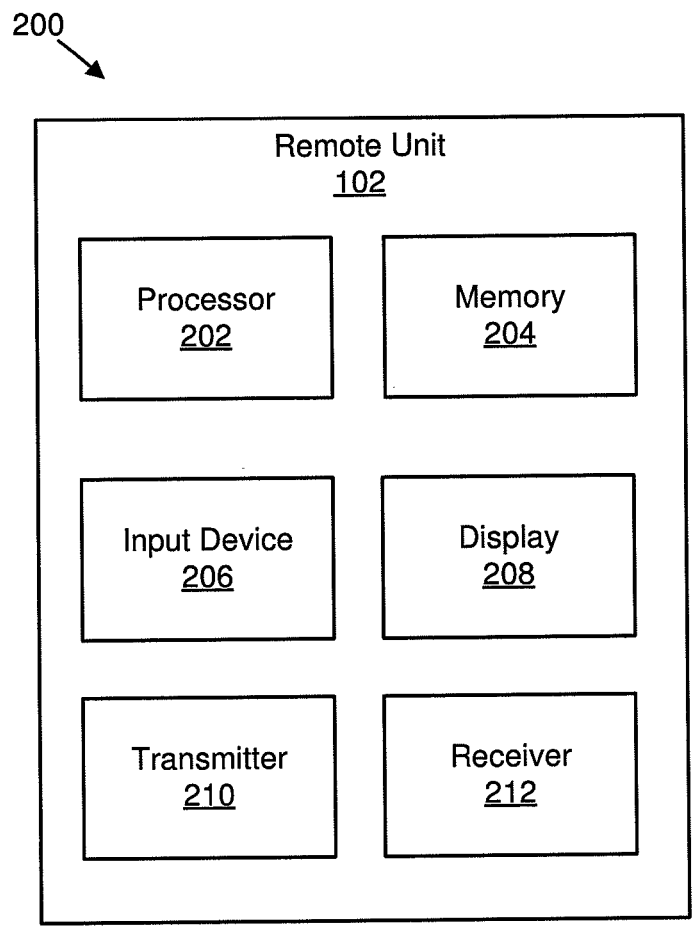
FIG. 2 is a schematic block diagram illustrating one embodiment of an apparatus that may be used for determining information corresponding to beamforming.

FIG. 2 depicts one embodiment of an apparatus 200 that may be used for determining information corresponding to beamforming. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a grouping arrangement corresponding to a type of beamforming. In such embodiments, the type of beamforming includes analog beamforming, digital beamforming, hybrid beamforming, or some combination thereof. In certain embodiments, the processor 202 may determine a set of information corresponding to the grouping arrangement. In such embodiments, the set of information includes the type of beamforming. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102. In one embodiment, the memory 204 receives data at a buffer at a first time.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 may be used to transmit a set of information to a base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
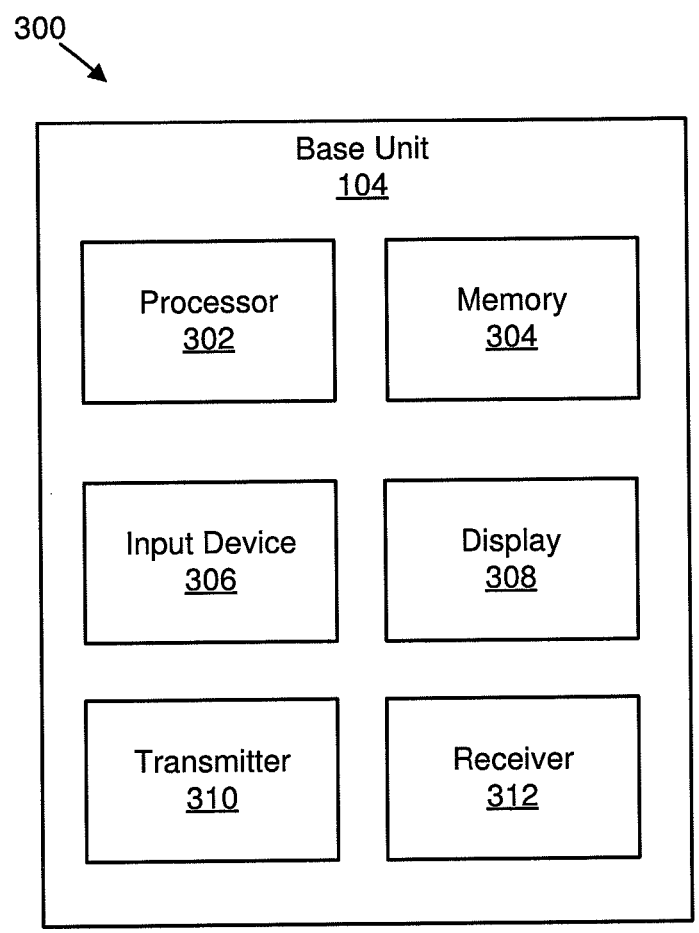
FIG. 3 is a schematic block diagram illustrating one embodiment of an apparatus that may be used for receiving information corresponding to beamforming.

FIG. 3 depicts one embodiment of an apparatus 300 that may be used for receiving information corresponding to beamforming. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive a set of information from a remote unit 102. In various embodiments, the set of information includes a type of beamforming and corresponds to a grouping arrangement, and the type of beamforming includes analog beamforming, digital beamforming, hybrid beamforming, or some combination thereof. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
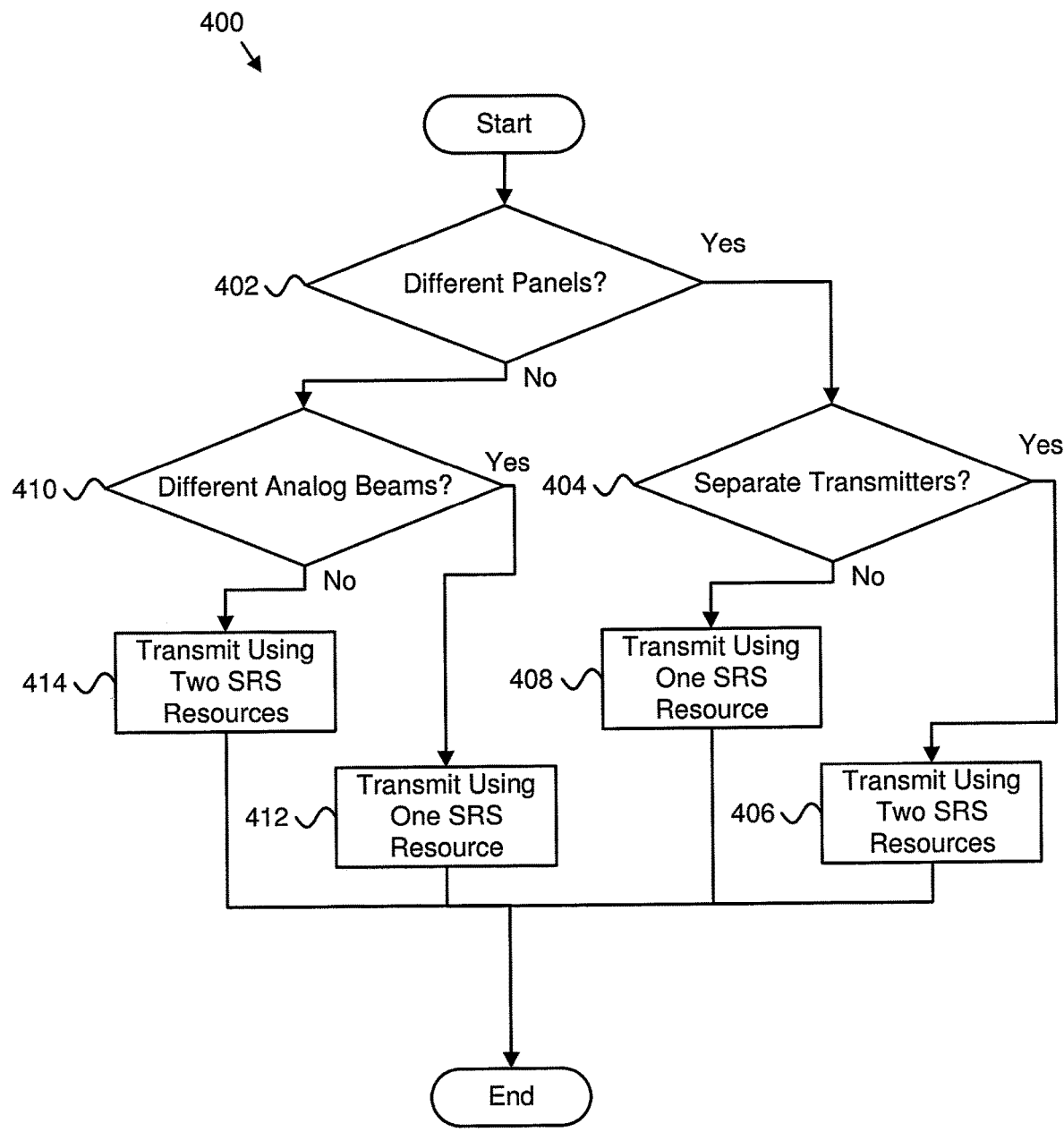
FIG. 4 is a schematic flow chart diagram illustrating one embodiment of a method for determining transmission resources.

FIG. 4 is a schematic flow chart diagram illustrating one embodiment of a method 400 for determining transmission resources. In various embodiments, different kinds of remote units 102, including remote units 102 with different UL beamforming schemes, may be used. In such embodiments, possible TX beamforming schemes that may be deployed at the remote unit 102 side include analog TX beamforming, digital TX beamforming, and/or hybrid TX beamforming. These different TX beamforming schemes may have different capabilities. For example, with analog beamforming, steering of a TX beam may be achieved by adjustment of phase shifters in a TX power distribution network, and only one set of phase shift values may be applied. Accordingly, with analog beamforming, multiple beams with different phase shifts may not be transmitted. As another example, with digital beamforming, different beams may be generated with different precoders in the baseband, so different digital beams may be transmitted simultaneously. However, with digital beamforming, a total transmission power is shared between different beams. As a further example, with hybrid beamforming, beams may be generated with a combination of analog phase shift and baseband digital precoder. In such an example, two beams with different phase shifts may not be transmitted together, and two beams generated with the same phase shift but a different baseband precoder may be transmitted together subject to the total power constraint (e.g., that the total transmission power is shared between different beams).

In some embodiments, a remote unit 102 may have multiple panels with separate or shared transmitters. In embodiments that have separate transmitters, each panel may transmit independently. In embodiments that have shared transmitters, only one panel may transmit at a given time and a switch between different panels may be performed by TX antenna switching.

As used herein, the terms "resource" and "port" may be used interchangeably and may refer to substantially the same thing.

FIG. 4 illustrates a flow chart that may be used to determine whether two SRS resources may be used to transmit simultaneously, whether they may transmit independently, and/or whether transmissions are subject to a total TX power constraint. Specifically, the method 400 includes determining 402 whether a remote unit 102 has different (e.g., multiple) panels to be used for transmission. In response to determining 402 that the remote unit 102 has different panels, the method 400 includes determining 404 whether the remote unit 102 has separate transmitters. In response to determining 404 that the remote unit 102 has separate transmitters, the method 400 includes the ability for transmitting 406 using two (or more) SRS resources. In response to determining 404 that the remote unit 102 does not have separate transmitters, the method 400 includes the ability for transmitting 408 using only one SRS resource.

In response to determining 402 that the remote unit 102 does not have different panels, the method 400 includes determining 410 whether the remote unit 102 has different analog beams. In response to determining 410 that the remote unit 102 has different analog beams, the method 400 includes the ability for transmitting 412 using only one SRS resource (e.g., two SRS resources cannot transmit simultaneously). In response to determining 410 that the remote unit 102 does not have different analog beams, the method 400 includes the ability for transmitting 414 using two (or more) SRS resources (e.g., with shared TX power).

Various constraints of a remote unit 102 may be used to determine whether two SRS resources may be used for transmission simultaneously. Because different remote units 102 may have different TX implementations, remote unit 102 transmission constraints may be signaled to a base unit 104. Moreover, based on the remote unit 102 transmission constraints, a base unit 104 may determine SRI. Various examples of remote unit 102 transmission constraints and determinations of the base unit 104 determining SRI are illustrated in FIGS. 5 through 13. The examples may be applicable to non-codebook based UL transmission and/or codebook based UL transmission.

The solutions for transmitting information from a remote unit 102 may be different for different types of beamforming (e.g., analog beamforming, digital beamforming, and/or hybrid beamforming). The configuration of the remote unit 102 antennas may be signaled to a base unit 104 through RRC messages based on a grouping arrangement corresponding to the types of beamforming. In some embodiments, a remote unit 102 may signal an indicator to a base unit 104 indicating which grouping arrangement it uses (corresponding to analog, hybrid or digital beamforming). Described herein are two schemes that may be used. These two schemes are described herein as scheme A and scheme B.

Figure 5:
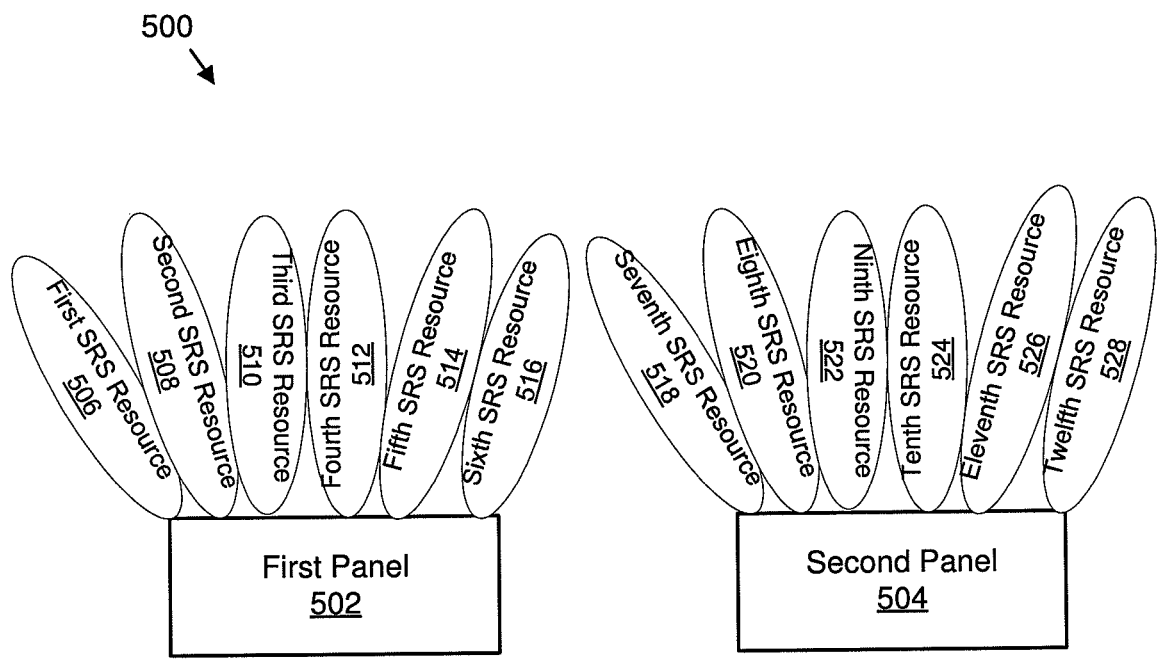
FIG. 5 is a schematic block diagram illustrating one embodiment of analog beamforming with two panels and two groups.

FIG. 5 is a schematic block diagram 500 illustrating one embodiment of analog beamforming with two panels and two groups. The schematic block diagram 500 includes a first panel 502 and a second panel 504. The first panel 502 includes a first SRS resource 506, a second SRS resource 508, a third SRS resource 510, a fourth SRS resource 512, a fifth SRS resource 514, and a sixth SRS resource 516. Moreover, the second panel 504 includes a seventh SRS resource 518, an eighth SRS resource 520, a ninth SRS resource 522, a tenth SRS resource 524, an eleventh SRS resource 526, and a twelfth SRS resource 528.

In embodiments in which analog beamforming is used by a remote unit 102, beams from a same panel cannot be transmitted simultaneously because they are generated with different analog beams. Accordingly, all SRS resources from a same panel may be included in a same group for scheme A. In the example shown in FIG. 5, the SRS resource groups for scheme A are listed as follows: $G_1=\{$first SRS resource 506, second SRS resource 508, third SRS resource 510, fourth SRS resource 512, fifth SRS resource 514, sixth SRS resource 516$\}$, $G_2=\{$seventh SRS resource 518, eighth SRS resource 520, ninth SRS resource 522, tenth SRS resource 524, eleventh SRS resource 526, twelfth SRS resource 528$\}$.

As part of scheme A, SRS resources in a same group cannot be used for UL transmission simultaneously. Moreover, as part of scheme A, whether two SRS resources in two different groups (e.g., from different panels) may be used for UL transmission simultaneously depends on whether the two different groups share any TX components. If the two different groups share any TX components, UL transmissions for two SRS resources are signaled separately. Moreover, as part of scheme A, a remote unit 102 signals to a base unit 104 one or more no-co-use-groups ("NCUG") (or non-co-transmission groups). In certain embodiments, two groups in a same NCUG cannot transmit together. For example, if the two groups of SRS resources, $G_1$ and $G_2$, cannot be transmitted together, the NCUG may be defined as: $NCUG_1=\{G_1, G_2\}$.

The remote unit 102 to base unit 104 signaling for scheme A may include one or more of the following: {Indicator for grouping arrangement (e.g., method 1—corresponding to analog beams); Number of SRS resources; Number of SRS groups; SRS resources in each SRS group; Number of NCUG; SRS groups in each NCUG}.

For scheme B, all the SRS resources in a same SRS group may be transmitted simultaneously. Thus, for scheme B, a remote unit 102 may report correspondence between SRS groups and panels, for example $P_1=\{G_1, G_2\}$ may mean that SRS resources of SRS group 1 ($G_1$) and SRS group 2 ($G_2$) are transmitted from panel 1 ($P_1$). In various embodiments, panels may be grouped based on SRS resources that cannot be transmitted together. For example, all panels in a same panel group cannot transmit SRS resources simultaneously. Accordingly, the remote unit 102 to base unit 104 signaling for scheme B may include one or more of the following: {Beamforming architecture (e.g., analog, hybrid, and/or digital); Number of SRS resources; Number of SRS groups; SRS resources for each SRS group; Number of panels; SRS groups for each panel; Number of panel groups; Panels in each panel group}.

In certain embodiments, each SRS resource corresponds to an SRS group for analog beamforming, therefore a number of SRS groups may equal a number of SRS resources.

In some embodiments, each SRS group may correspond to a panel for digital beamforming, therefore a number of SRS groups may equal a number of panels. In various embodiments, if a number of panels equals 2, a number of panel groups and a panel group indicator may be replaced by a 1 bit panel selection indicator to reduce feedback overhead.

For the example illustrated in FIG. 5, if two panels have totally separate RF chains, the following may be included in information transmitted from a remote unit 102 to a base unit 104 based on scheme A: {Indicator for grouping arrangement: method 1; Number of SRS resources=12; Number of SRS groups=2; $G_1=\{$first SRS resource 506, second SRS resource 508, third SRS resource 510, fourth SRS resource 512, fifth SRS resource 514, sixth is SRS resource 516$\}$; $G_2=\{$seventh SRS resource 518, eighth SRS resource 520, ninth SRS resource 522, tenth SRS resource 524, eleventh SRS resource 526, twelfth SRS resource 528$\}$; Number of NCUG=0;}.

Moreover, for the example illustrated in FIG. 5, if two panels have totally separate RF chains, the following may be included in information transmitted from a remote unit 102 to a base unit 104 based on scheme B: {Beamforming architecture: analog; Number of SRS resources=12; Number of panels=2; $P_1=\{$first SRS resource 506, second SRS resource 508, third SRS resource 510, fourth SRS resource 512, fifth SRS resource 514, sixth SRS resource 516$\}$; $P_2=\{$seventh SRS resource 518, eighth SRS resource 520, ninth SRS resource 522, tenth SRS resource 524, eleventh SRS resource 526, twelfth SRS resource 528$\}$; Number of panel groups=2; $PG_1=\{P_1\}$; $PG_2=\{P_2\}$}.

Figure 6:
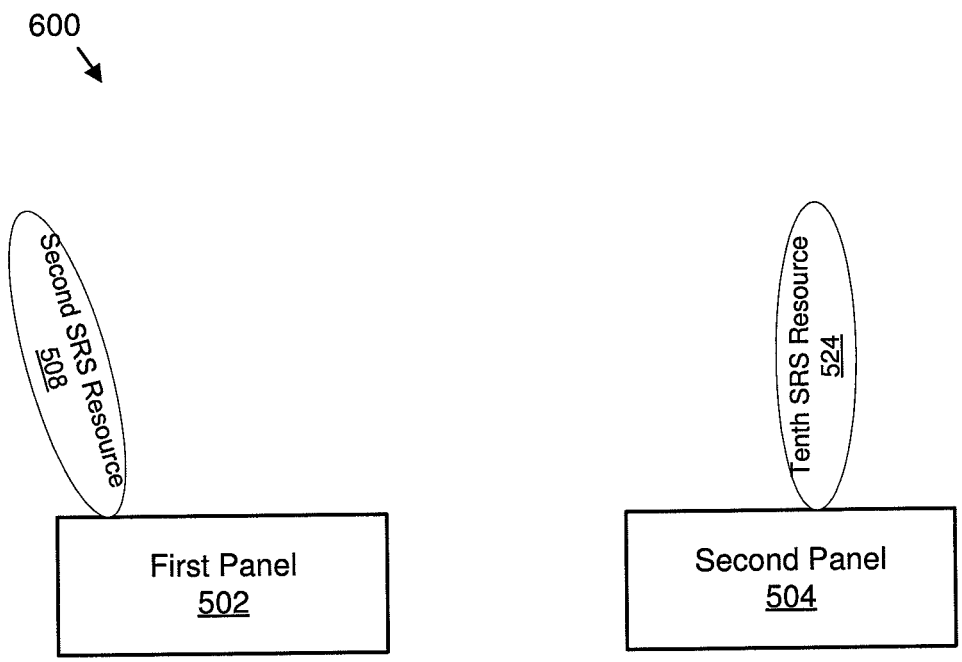
FIG. 6 is a schematic block diagram illustrating one embodiment of analog beamforming resource selection.

FIG. 6 is a schematic block diagram 600 illustrating one embodiment of analog beamforming resource selection. The schematic block diagram 600 includes the first panel 502 and the second panel 504 described in relation to FIG. 5. The base unit 104 may determine the SRI (e.g., choose the SRS resources) for UL PUCCH or PUSCH transmission based on the UL beamforming configuration and the SRS it receives.

As an example, it may determine the SRI={second SRS resource 508, tenth SRS resource 524} as illustrated in FIG. 6.

In certain embodiments, such as embodiments in which two panels share some of their RF chains (e.g., such as digital-to-analog converters ("DACs")), only one of the panels may transmit at any time and may switch transmission to another panel using TX antenna panel switching. In embodiments in which two panels share some of their RF chains, the following may be included in information transmitted from a remote unit 102 to a base unit 104 based on scheme A: {Indicator for grouping arrangement: method 1; Number of SRS resources=12; Number of SRS groups=2; $G_1$={first SRS resource 506, second SRS resource 508, third SRS resource 510, fourth SRS resource 512, fifth SRS resource 514, sixth SRS resource 516); $G_2$={seventh SRS resource 518, eighth SRS resource 520, ninth SRS resource 522, tenth SRS resource 524, eleventh SRS resource 526, twelfth SRS resource 528); Number of NCUG=1; NCUG1={$G_1$, $G_2$}}.

In embodiments in which two panels share some of their RF chains, the following may be included in information transmitted from a remote unit 102 to a base unit 104 based on scheme B: {Beamforming architecture: analog; Number of SRS resources=12; Number of panels=2; $P_1$={first SRS resource 506, second SRS resource 508, third SRS resource 510, fourth SRS resource 512, fifth SRS resource 514, sixth SRS resource 516); $P_2$={seventh SRS resource 518, eighth SRS resource 520, ninth SRS resource 522, tenth SRS resource 524, eleventh SRS resource 526, twelfth SRS resource 528); Number of panel groups=1; $PG_1$={$P_1$, $P_2$}}.

Figure 7:
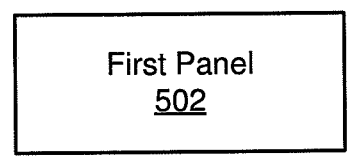
FIG. 7 is a schematic block diagram illustrating another embodiment of analog beamforming resource selection.
Figure 7:
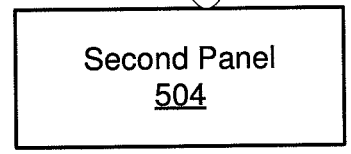

FIG. 7 is a schematic block diagram 700 illustrating another embodiment of analog beamforming resource selection. The schematic block diagram 700 includes the first panel 502 and the second panel 504 described in relation to FIG. 5. In embodiments in which two panels share some of the RF chains, the base unit 104 may only choose one SRS resource from one of the groups for the remote unit 102 to transmit in UL. As an example, it may determine the SRI={tenth SRS resource 524} as illustrated in FIG. 7.

Figure 8:
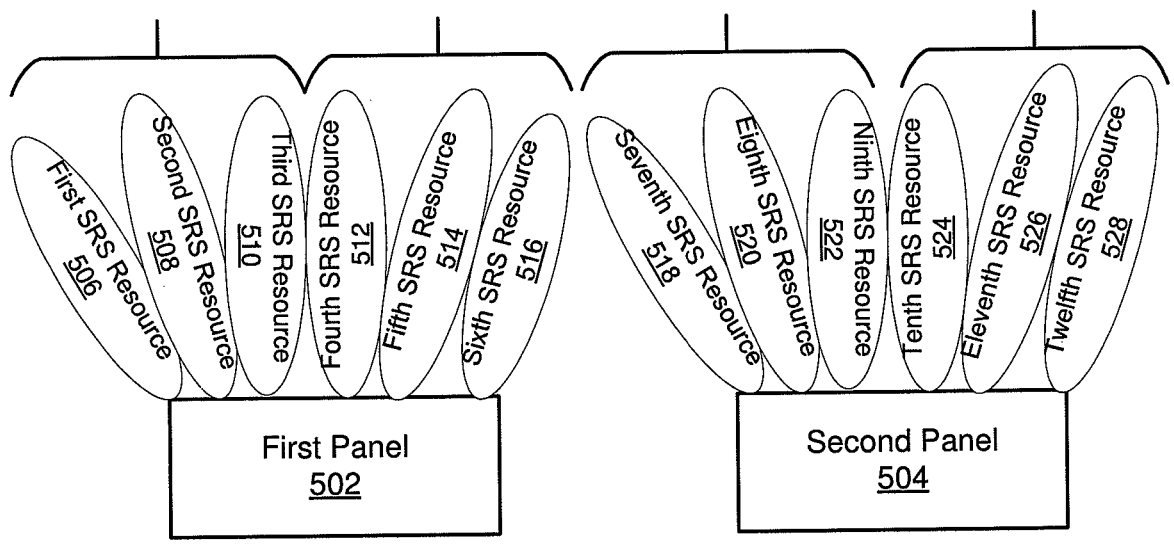
FIG. 8 is a schematic block diagram illustrating one embodiment of hybrid beamforming with two panels and four groups.

FIG. 8 is a schematic block diagram 800 illustrating one embodiment of hybrid beamforming with two panels and four groups. The schematic block diagram 800 includes the first panel 502 and the second panel 504 described in relation to FIG. 5.

In response to hybrid beamforming being used by a remote unit 102, multiple SRS resources may share the same analog beam and may be transmitted simultaneously. Full digital beamforming may be considered a special case of hybrid beamforming in which all the digital beams share a same fixed analog beam (e.g., phase shift value). In some embodiments, a remote unit 102 may group SRS resources based on whether they are on the same panel and based on whether they use the same analog beam. In certain embodiments, only SRS resources based on the same analog beam and on the same panel may be put in a same group. In the example of FIG. 8, 4 analog beams may be sent from 2 panels, where each analog beam has a group of digital beams. Specifically, a first analog beam 802 includes the first SRS resource 506, the second SRS resource 508, and the third SRS resource 510. Moreover, a second analog beam 804 includes the fourth SRS resource 512, the fifth SRS resource 514, and the sixth SRS resource 516. Furthermore, a third analog beam 806 includes the seventh SRS resource 518, the eighth SRS resource 520, and the ninth SRS resource 522. In addition, a fourth analog beam 808 includes the tenth SRS resource 524, the eleventh SRS resource 526, and the twelfth SRS resource 528. Because the first analog beam 802 and the second analog beam 804 are on the same panel (e.g., first panel 502), only one of the analog beams 802 and 804 may be transmitted at a time. In contrast, more than one resource within one of the analog beams 802 and 804 may be transmitted concurrently. Furthermore, because the third analog beam 806 and the fourth analog beam 808 are on the same panel (e.g., second panel 504), only one of the analog beams 806 and 808 may be transmitted at a time. In contrast, more than one resource within one of the analog beams 806 and 808 may be transmitted concurrently.

The SRS groups for scheme A and scheme B may be defined as follows: $G_1$={first SRS resource 506, second SRS resource 508, third SRS resource 510}; $G_2$={fourth SRS resource 512, fifth SRS resource 514, sixth SRS resource 516}; $G_3$={seventh SRS resource 518, eighth SRS resource 520, ninth SRS resource 522}; $G_4$={tenth SRS resource 524, eleventh SRS resource 526, twelfth SRS resource 528}.

It should be noted that, all the SRS resources in an SRS group have a same analog beam (e.g., phase shift) and may be transmitted together. However, the SRS resources are subject to a total TX power constraint of the analog beam. For example, in response to N SRS resources in a group being scheduled by SRI, by default each SRS resource is transmitted with 1/N of the total TX power. Moreover, different groups in a same antenna panel are based on different analog beams and may not be transmitted together. Furthermore, different groups in different antenna panels may or may not be transmitted together depending on details of a remote unit 102 implementation. For example, some remote unit 102 implementations share part of an RF chains between antenna panels and makes it impossible to transmit simultaneously from different panels. While a remote unit 102 may not need to provide specific details of its panel and/or RF implementation to a base unit 104, schemes A and Be may be used to provide sufficient information to a base unit 104 for the base unit 104 to select SRI. In various embodiments, if two panels have independent RF chains and may transmit simultaneously, the NCUGs for scheme A may be defined as follows: $NCUG_1$={$G_1$, $G_2$}, $NCUG_2$={$G_3$, $G_4$}.

In some embodiments, if two panels have totally separate RF chains, the following may be included in information transmitted from a remote unit 102 to a base unit 104 based on scheme A: {Indicator for grouping arrangement: method 2 (e.g., corresponding to hybrid and/or digital beams); Number of SRS resources=12; Number of SRS groups=4; $G_1$={first SRS resource 506, second SRS resource 508, third SRS resource 510}; $G_2$={fourth SRS resource 512, fifth SRS resource 514, sixth SRS resource 516}; $G_3$={seventh SRS resource 518, eighth SRS resource 520, ninth SRS resource 522}; $G_4$={tenth SRS resource 524, eleventh SRS resource 526, twelfth SRS resource 528}; Number of NCUG=2; $NCUG_1$={$G_1$, $G_2$}, $NCUG_2$={$G_3$, $G_4$}}.

In various embodiments, if two panels have totally separate RF chains, the following may be included in information transmitted from a remote unit 102 to a base unit 104 based on scheme B: {Beamforming architecture: hybrid; Number of SRS resources=12; Number of SRS groups=4; $G_1$={first SRS resource 506, second SRS resource 508, third SRS resource 510}; $G_2$={fourth SRS resource 512, fifth SRS resource 514, sixth SRS resource 516}; $G_3$={seventh SRS resource 518, eighth SRS resource 520, ninth SRS resource 522}; $G_4$={ tenth SRS resource 524, eleventh SRS resource 526, twelfth SRS resource 528}; Number of panels=2; $P_1$={$G_1$,$G_2$}; $P_2$={$G_3$,$G_4$}; Number of panel groups=2; $PG_1$={$P_1$};$PG_2$={$P_2$}}.

Figure 9:
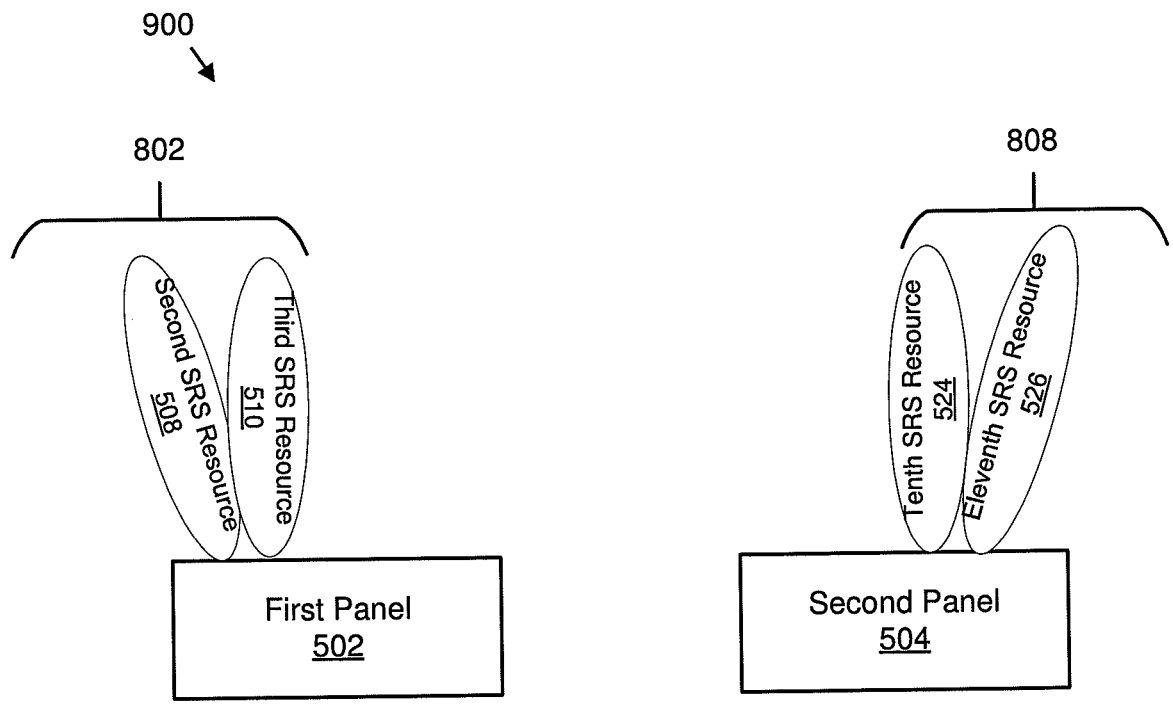
FIG. 9 is a schematic block diagram illustrating one embodiment of hybrid beamforming resource selection.

FIG. 9 is a schematic block diagram 900 illustrating one embodiment of hybrid beamforming resource selection. The schematic block diagram 900 includes the first panel 502 and the second panel 504 described in relation to FIG. 5, and the first analog beam 802, the second analog beam 804, the third analog beam 806, and the fourth analog beam 808 described in relation to FIG. 8.

In certain embodiments, based on the configuration signals from a remote unit 102 described in relation to FIG. 8 and based on an SRS measurement, a base unit 104 may decide to use {second SRS resource 508, third SRS resource 510, tenth SRS resource 524, eleventh SRS resource 526} for a remote unit 102 to transmit in UL. Accordingly, the base unit 104 may signal SRI={second SRS resource 508, third SRS resource 510, tenth SRS resource 524, eleventh SRS resource 526} as illustrated in FIG. 9, and a remote unit 102 may transmit with the following beams: the remote unit 102 may transmit {second SRS resource 508, third SRS resource 510} each with half of the total TX power from the first panel 502, and {tenth SRS resource 524, eleventh SRS resource 526} each with half of the total TX power from the second panel 504.

In some embodiments in which two panels share part of RF chains and a remote unit 102 may only transmit from one of the two panels, the remote unit 102 may define the NCUG as follows: $NCUG_1=\{G_1, G_2, G_3, G_4\}$.

In some embodiments, if two panels do not have totally separate RF chains, the following may be included in information transmitted from a remote unit 102 to a base unit 104 based on scheme A: {Indicator for grouping arrangement: method 2; Number of SRS resources=12; Number of SRS groups=4; $G_1$={first SRS resource 506, second SRS resource 508, third SRS resource 510}; $G_2$={fourth SRS resource 512, fifth SRS resource 514, sixth SRS resource 516}; $G_3$={seventh SRS resource 518, eighth SRS resource 520, ninth SRS resource 522}; $G_4$={tenth SRS resource 524, eleventh SRS resource 526, twelfth SRS resource 528}; Number of NCUG=1; $NCUG_1=\{G_1,G_2,G_3,G_4\}$}.

In certain embodiments, if two panels do not have totally separate RF chains, the following may be included in information transmitted from a remote unit 102 to a base unit 104 based on scheme B: {Beamforming architecture: hybrid; Number of SRS resources=12; Number of SRS groups=4; $G_1$={first SRS resource 506, second SRS resource 508, third SRS resource 510}; $G_2$={fourth SRS resource 512, fifth SRS resource 514, sixth SRS resource 516}; $G_3$={seventh SRS resource 518, eighth SRS resource 520, ninth SRS resource 522}; $G_4$={tenth SRS resource 524, eleventh SRS resource 526, twelfth SRS resource 528}; Number of panels=2; $P_1=\{G_1,G_2\}$; $P_2=\{G_3,G_4\}$; Number of panel groups=1; $PG_1=\{P_1,P_2\}$}.

Figure 10:
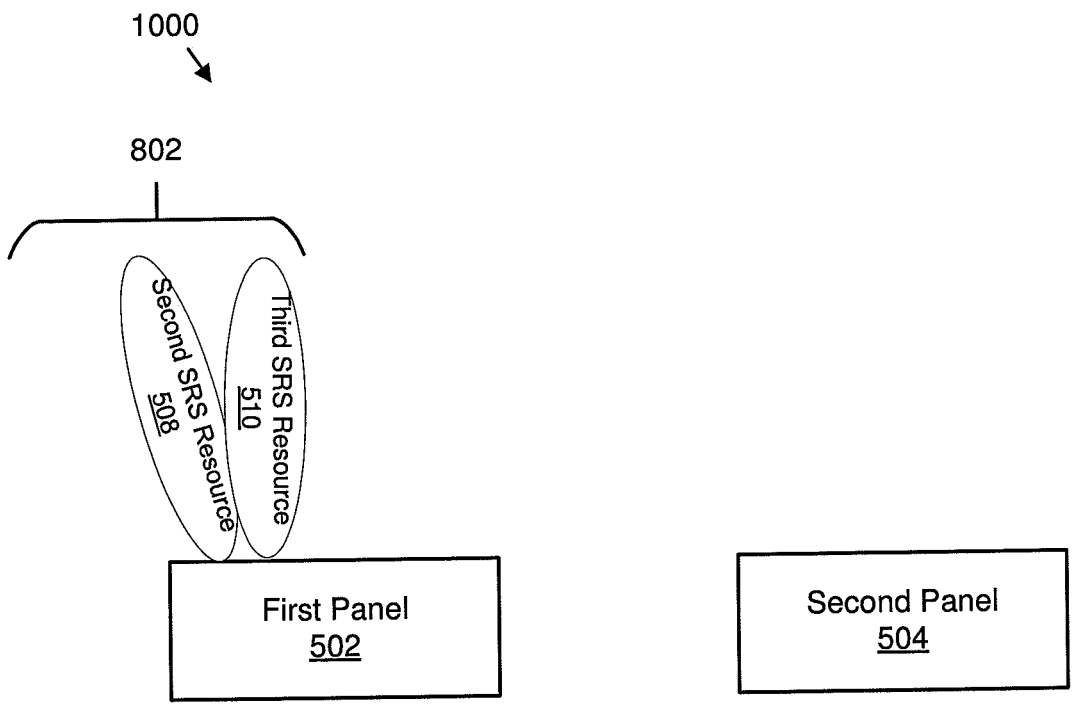
FIG. 10 is a schematic block diagram illustrating another embodiment of hybrid beamforming resource selection.

FIG. 10 is a schematic block diagram 1000 illustrating another embodiment of hybrid beamforming resource selection. The schematic block diagram 1000 includes the first panel 502 and the second panel 504 described in relation to FIG. 5, and the first analog beam 802, the second analog beam 804, the third analog beam 806, and the fourth analog beam 808 described in relation to FIG. 8.

In certain embodiments, based on the configuration signals from a remote unit 102 and based on an SRS measurement, a base unit 104 may decide to use {second SRS resource 508, third SRS resource 510} for a remote unit 102 to transmit in UL. Accordingly, the base unit 104 may signal SRI={second SRS resource 508, third SRS resource 510} as illustrated in FIG. 10, and a remote unit 102 may transmit with the following beams: the remote unit 102 may transmit the SRS resources {second SRS resource 508, third SRS resource 510} each with half of the total TX power of the panel.

In some embodiments, in response digital beamforming being used by a remote unit 102, all digital beams in a single panel share a same analog beam. Accordingly, all SRS resources from a same panel may be included in an SRS group for scheme A and scheme B.

Figure 11:
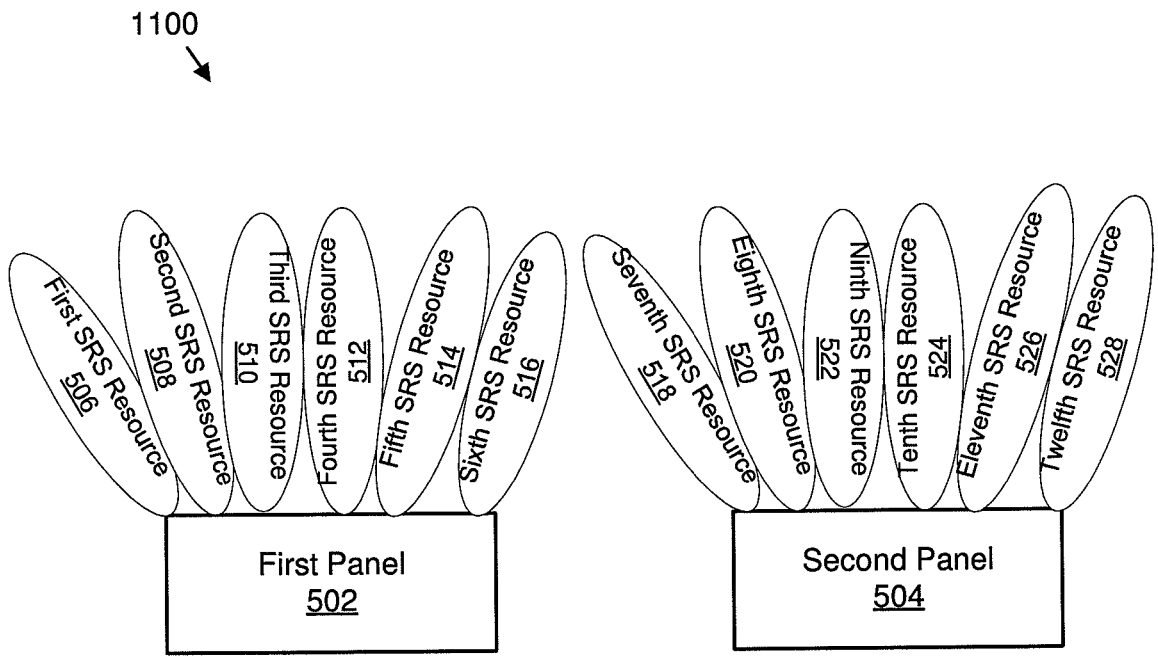
FIG. 11 is a schematic block diagram illustrating one embodiment of digital beamforming with two panels.

FIG. 11 is a schematic block diagram 1100 illustrating one embodiment of digital beamforming with two panels. The schematic block diagram 1100 includes the first panel 502 and the second panel 504 described in relation to FIG. 5.

In some embodiments, if two panels have totally separate RF chains, the following may be included in information transmitted from a remote unit 102 to a base unit 104 based on scheme A: {Indicator for grouping arrangement: method 2; Number of SRS resources=12; Number of SRS groups=2; $G_1$={first SRS resource 506, second SRS resource 508, third SRS resource 510, fourth SRS resource 512, fifth SRS resource 514, sixth SRS resource 516}; $G_2$={seventh SRS resource 518, eighth SRS resource 520, ninth SRS resource 522, tenth SRS resource 524, eleventh SRS resource 526, twelfth SRS resource 528}; Number of NCUG=0}.

In certain embodiments, if two panels have totally separate RF chains, the following may be included in information transmitted from a remote unit 102 to a base unit 104 based on scheme B: {Beamforming architecture: digital; Number of SRS resources=12; Number of panels=2; $G_1$={first SRS resource 506, second SRS resource 508, third SRS resource 510, fourth SRS resource 512, fifth SRS resource 514, sixth SRS resource 516}; $G_2$={seventh SRS resource 518, eighth SRS resource 520, ninth SRS resource 522, tenth SRS resource 524, eleventh SRS resource 526, twelfth SRS resource 528}; Number of panel groups=2; $PG_1=\{G_1\}$; $PG_2=\{G_2\}$}.

Figure 12:
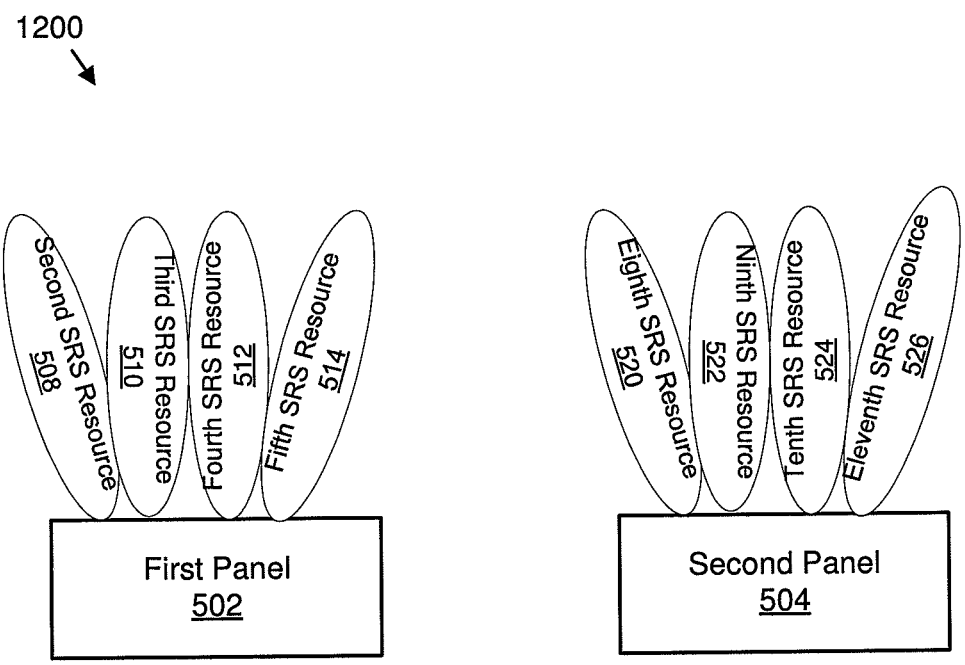
FIG. 12 is a schematic block diagram illustrating one embodiment of digital beamforming resource selection.

FIG. 12 is a schematic block diagram 1200 illustrating one embodiment of digital beamforming resource selection. The schematic block diagram 1200 includes the first panel 502 and the second panel 504 described in relation to FIG. 5.

In certain embodiments, based on the configuration signals from a remote unit 102 described in relation to FIG. 8 and based on an SRS measurement, a base unit 104 may decide to use {second SRS resource 508, third SRS resource 510, fourth SRS resource 512, fifth SRS resource 514, eighth SRS resource 520, ninth SRS resource 522, tenth SRS resource 524, eleventh SRS resource 526} for a remote unit 102 to transmit in UL. Accordingly, the base unit 104 may signal SRI={second SRS resource 508, third SRS resource 510, fourth SRS resource 512, fifth SRS resource 514, eighth SRS resource 520, ninth SRS resource 522, tenth SRS resource 524, eleventh SRS resource 526} as illustrated in FIG. 12.

In some embodiments in which two panels share part of RF changes and a remote unit 102 may only transmit from one of the two panels.

In some embodiments, if two panels do not have totally separate RF chains, the following may be included in information transmitted from a remote unit 102 to a base unit 104 based on scheme A: {Indicator for grouping arrangement: method 2; Number of SRS resources=12; Number of SRS groups=2; $G_1$={first SRS resource 506, second SRS resource 508, third SRS resource 510, fourth SRS resource 512, fifth SRS resource 514, sixth SRS resource 516}; $G_2$={seventh SRS resource 518, eighth SRS resource 520, ninth SRS resource 522, tenth SRS resource 524, eleventh SRS resource 526, twelfth SRS resource 528}; Number of NCUG=1; NCUG={$G_1,G_2$}}.

In various embodiments, if two panels do not have totally separate RF chains, the following may be included in information transmitted from a remote unit 102 to a base unit 104 based on scheme B: {Beamforming architecture: digital; Number of SRS resources=12; Number of panels=2; $G_1$={first SRS resource 506, second SRS resource 508, third SRS resource 510, fourth SRS resource 512, fifth SRS resource 514, sixth SRS resource 516}; $G_2$={seventh SRS resource 518, eighth SRS resource 520, ninth SRS resource 522, tenth SRS resource 524, eleventh SRS resource 526, twelfth SRS resource 528}; Number of panel groups=1; $PG_1$={$G_1,G_2$}}.

Figure 13:
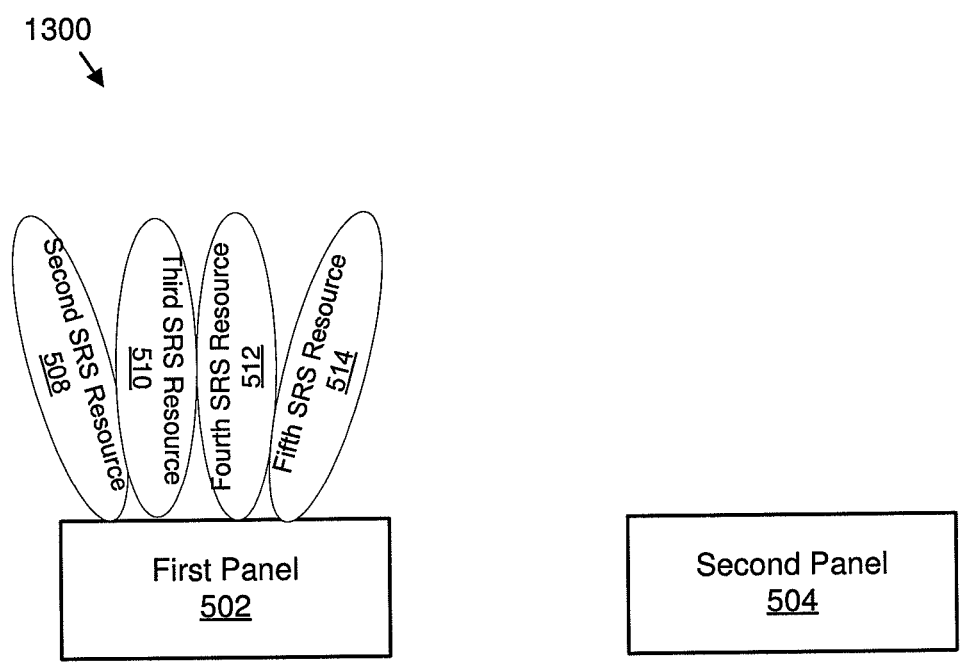
FIG. 13 is a schematic block diagram illustrating another embodiment of digital beamforming resource selection.

FIG. 13 is a schematic block diagram 1300 illustrating another embodiment of digital beamforming resource selection. The schematic block diagram 1300 includes the first panel 502 and the second panel 504 described in relation to FIG. 5.

In certain embodiments, based on the configuration signals from a remote unit 102 and based on an SRS measurement, a base unit 104 may decide to use {second SRS resource 508, third SRS resource 510, fourth SRS resource 512, fifth SRS resource 514} for a remote unit 102 to transmit in UL. Accordingly, the base unit 104 may signal SRI={second SRS resource 508, third SRS resource 510, fourth SRS resource 512, fifth SRS resource 514} as illustrated in FIG. 13.

Similar to non-codebook based UL transmission, SRI may be used by codebook based UL transmission in conjunction with a transmitted precoding matrix indicator ("TPMI") and other parameters. The same SRS grouping and signaling method for non-codebook and codebook based UL transmissions may be used. With an SRI determined, a base unit 104 may determine a TPMI applied to a selected SRS resources. The determination of TPMI may be based on a base unit 104 implementation.

Figure 14:
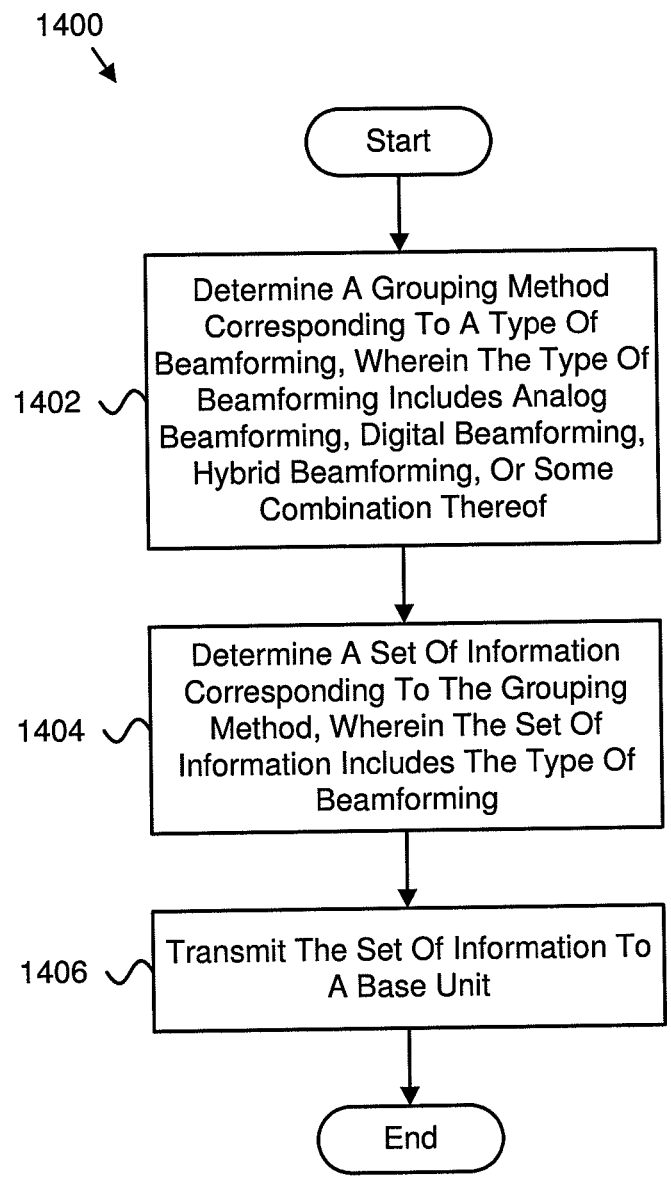
FIG. 14 is a schematic flow chart diagram illustrating one embodiment of a method for determining information corresponding to beamforming.

FIG. 14 is a schematic flow chart diagram illustrating one embodiment of a method 1400 for determining information corresponding to beamforming. In some embodiments, the method 1400 is performed by an apparatus, such as the remote unit 102. In certain embodiments, the method 1400 may be performed by a processor executing program code, for example, a microcontroller, a microprocessor, a CPU, a GPU, an auxiliary processing unit, a FPGA, or the like.

The method 1400 may include determining 1402 a grouping arrangement corresponding to a type of beamforming. In such an embodiment, the type of beamforming may include analog beamforming, digital beamforming, hybrid beamforming, or some combination thereof. In certain embodiments, the method 1400 includes determining 1404 a set of information corresponding to the grouping arrangement. In such embodiments, the set of information includes the type of beamforming. In some embodiments, the method 1400 includes transmitting 1406 the set of information to a base unit 104.

In one embodiment, the set of information includes a number of sounding reference signal resources, a number of sounding reference signal groups, or some combination thereof. In a further embodiment, the number of sounding reference signal resources is greater than zero, the number of sounding reference signal groups is greater than zero, or some combination thereof. In certain embodiments, the grouping arrangement is selected from a set including a first scheme and a second scheme. In various embodiments, the set of information for the first scheme includes a number of non-co-transmission groups. In some embodiments, the set of information for the first scheme includes, in response to the number of non-co-transmission groups being greater than zero, information that indicates sounding reference signal groups that belong to each non-co-transmission group of the non-co-transmission groups. In such embodiments, a base unit 104 is limited to determining a maximum of one sounding reference signal resource from each non-co-transmission group for use.

In certain embodiments, the set of information for the first scheme includes, in response to the type of beamforming including analog beamforming, information that indicates at least one sounding reference signal group, each sounding reference signal group of the at least one sounding reference signal group includes sounding reference signal resources for a same antenna panel, and a base unit 104 is limited to determining a maximum of one sounding reference signal resource from each sounding reference signal group. In some embodiments, the set of information for the first scheme includes, in response to the type of beamforming including digital beamforming, hybrid beamforming, or a combination thereof, information that indicates at least one sounding reference signal group, each sounding reference signal group of the at least one sounding reference signal group includes sounding reference signal resources for a same analog beam and a same antenna panel, and a base unit 104 is configured to determine any number of sounding reference signal resources from each sounding reference signal group.

In various embodiments, the set of information for the second scheme includes a number of panels and a number of panel groups. In certain embodiments, the number of panels is greater than zero and the number of panel groups is greater than zero. In some embodiments, the set of information for the second scheme includes, in response to the type of beamforming including hybrid beamforming, information that indicates at least one sounding reference signal group, each sounding reference signal group of the at least one sounding reference signal group includes sounding reference signal resources for a same analog beam and a same antenna panel, and a base unit 104 is configured to determine any number of sounding reference signal resources from each sounding reference signal group.

In certain embodiments, the set of information for the second scheme includes, in response to the type of beamforming including digital beamforming, information that indicates at least one sounding reference signal group, each sounding reference signal group of the at least one sounding reference signal group includes sounding reference signal resources for a same antenna panel, and a base unit 104 is configured to determine any number of sounding reference signal resources from each sounding reference signal group. In various embodiments, the set of information for the second scheme includes information that indicates at least one sounding reference signal panel group, each sounding reference signal panel group of the at least one sounding reference signal panel group includes at least one sounding reference signal group, and a base unit 104 is configured to determine a maximum number of one sounding reference signal group from the at least one sounding reference signal group of each sounding reference signal panel group. In some embodiments, the method 1400 includes receiving information that indicates a sounding reference signal port for uplink transmission. In such embodiments, the sounding reference signal port is determined based on the set of information.

In various embodiments, the method 1400 includes transmitting uplink data using the sounding reference signal port.

In some embodiments, the method 1400 includes receiving information that indicates multiple sounding reference signal ports for uplink transmission. In such embodiments, the multiple sounding reference signal ports is determined based on the set of information. In certain embodiments, the method 1400 includes transmitting uplink data using the multiple sounding reference signal ports. In such embodiments, transmission power is shared by sounding reference signal ports from a same sounding reference signal group.

In one embodiment, the set of information corresponds to a codebook based uplink transmission scheme. In some embodiments, the set of information corresponds to a non-codebook based uplink transmission scheme.

Figure 15:
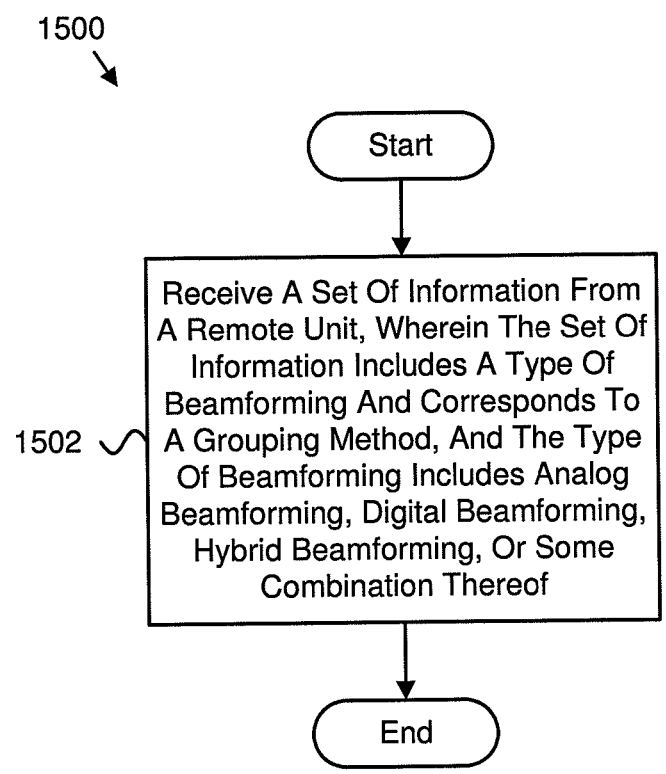
FIG. 15 is a schematic flow chart diagram illustrating one embodiment of a method for receiving information corresponding to beamforming.

FIG. 15 is a schematic flow chart diagram illustrating one embodiment of a method 1500 for receiving information corresponding to beamforming. In some embodiments, the method 1500 is performed by an apparatus, such as the base unit 104. In certain embodiments, the method 1500 may be performed by a processor executing program code, for example, a microcontroller, a microprocessor, a CPU, a GPU, an auxiliary processing unit, a FPGA, or the like.

The method 1500 may include receiving 1502 a set of information from a remote unit 102. In various embodiments, the set of information includes a type of beamforming and corresponds to a grouping arrangement, and the type of beamforming includes analog beamforming, digital beamforming, hybrid beamforming, or some combination thereof.

In one embodiment, the set of information includes a number of sounding reference signal resources, a number of sounding reference signal groups, or some combination thereof. In a further embodiment, the number of sounding reference signal resources is greater than zero, the number of sounding reference signal groups is greater than zero, or some combination thereof. In certain embodiments, the grouping arrangement is selected from a set including a first scheme and a second scheme. In various embodiments, the set of information for the first scheme includes a number of non-co-transmission groups. In some embodiments, the set of information for the first scheme includes, in response to the number of non-co-transmission groups being greater than zero, information that indicates sounding reference signal groups that belong to each non-co-transmission group of the non-co-transmission groups. In one embodiment, the method 1500 includes determining a maximum of one sounding reference signal resource from each non-co-transmission group for use.

In certain embodiments, the set of information for the first scheme includes, in response to the type of beamforming including analog beamforming, information that indicates at least one sounding reference signal group, and each sounding reference signal group of the at least one sounding reference signal group includes sounding reference signal resources for a same antenna panel. In some embodiments, the method 1500 includes determining a maximum of one sounding reference signal resource from each sounding reference signal group. In various embodiments, the set of information for the first scheme includes, in response to the type of beamforming comprising digital beamforming, hybrid beamforming, or a combination thereof, information that indicates at least one sounding reference signal group, and each sounding reference signal group of the at least one sounding reference signal group includes sounding reference signal resources for a same analog beam and a same antenna panel. In certain embodiments, the method 1500 includes determining any number of sounding reference signal resources from each sounding reference signal group.

In various embodiments, the set of information for the second scheme includes a number of panels and a number of panel groups. In certain embodiments, the number of panels is greater than zero and the number of panel groups is greater than zero. In some embodiments, the set of information for the second scheme includes, in response to the type of beamforming including hybrid beamforming, information that indicates at least one sounding reference signal group, and each sounding reference signal group of the at least one sounding reference signal group includes sounding reference signal resources for a same analog beam and a same antenna panel. In one embodiment, the method 1500 includes determining any number of sounding reference signal resources from each sounding reference signal group.

In certain embodiments, the set of information for the second scheme includes, in response to the type of beamforming including digital beamforming, information that indicates at least one sounding reference signal group, and each sounding reference signal group of the at least one sounding reference signal group includes sounding reference signal resources for a same antenna panel. In some embodiments, the method 1500 includes determining any number of sounding reference signal resources from each sounding reference signal group. In various embodiments, the set of information for the second scheme includes information that indicates at least one sounding reference signal panel group, and each sounding reference signal panel group of the at least one sounding reference signal panel group includes at least one sounding reference signal group. In some embodiments, the method 1500 includes determining a maximum number of one sounding reference signal group from the at least one sounding reference signal group of each sounding reference signal panel group. In some embodiments, the method 1500 includes transmitting information that indicates a sounding reference signal port for uplink transmission. In various embodiments, the sounding reference signal port is determined based on the set of information.

In various embodiments, the method 1500 includes receiving uplink data from the sounding reference signal port. In some embodiments, the method 1500 includes transmitting information that indicates multiple sounding reference signal ports for uplink transmission. In such embodiments, the multiple sounding reference signal ports is determined based on the set of information. In certain embodiments, the method 1500 includes receiving uplink data from the multiple sounding reference signal ports. In such embodiments, transmission power is shared by sounding reference signal ports from a same sounding reference signal group.

In one embodiment, the set of information corresponds to a codebook based uplink transmission scheme. In some embodiments, the set of information corresponds to a non-codebook based uplink transmission scheme.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining a grouping arrangement corresponding to a type of beamforming, wherein the type of beamforming comprises analog beamforming, digital beamforming, hybrid beamforming, or some combination thereof;

determining a set of information corresponding to the grouping arrangement, wherein the set of information comprises the type of beamforming;

transmitting the set of information comprising the grouping arrangement to a base unit; and transmitting uplink data using a plurality of sounding reference signal ports, wherein transmission power is shared by sounding reference signal ports from a same sounding reference signal group.

2. The method of claim 1, further comprising receiving information that indicates a sounding reference signal port for uplink transmission, wherein the sounding reference signal port is determined based on the set of information.

3. The method of claim 1, further comprising receiving information that indicates the plurality of sounding reference signal ports for uplink transmission, wherein the plurality of sounding reference signal ports is determined based on the set of information.

4. An apparatus comprising:
a processor that:
determines a grouping arrangement corresponding to a type of beamforming, wherein the type of beamforming comprises analog beamforming, digital beamforming, hybrid beamforming, or some combination thereof; and
determines a set of information corresponding to the grouping arrangement, wherein the set of information comprises the type of beamforming; and
a transmitter that:
transmits the set of information comprising the grouping arrangement to a base unit; and
transmits uplink data using a plurality of sounding reference signal ports, wherein transmission power is shared by sounding reference signal ports from a same sounding reference signal group.

5. The apparatus of claim 4, wherein the grouping arrangement is selected from a set comprising a first scheme and a second scheme.

6. The apparatus of claim 5, wherein the set of information for the first scheme comprises a number of non-co-transmission groups.

7. The apparatus of claim 6, wherein the set of information for the first scheme comprises, in response to the number of non-co-transmission groups being greater than zero, information that indicates sounding reference signal groups that belong to each non-co-transmission group of the non-co-transmission groups, and wherein the base unit is limited to determining a maximum of one sounding reference signal resource from each non-co-transmission group for use.

8. The apparatus of claim 5, wherein the set of information for the first scheme comprises, in response to the type of beamforming comprising analog beamforming, information that indicates at least one sounding reference signal group, each sounding reference signal group of the at least one sounding reference signal group comprises sounding reference signal resources for a same antenna panel, and the base unit is limited to determining a maximum of one sounding reference signal resource from each sounding reference signal group.

9. The apparatus of claim 5, wherein the set of information for the first scheme comprises, in response to the type of beamforming comprising digital beamforming, hybrid beamforming, or a combination thereof, information that indicates at least one sounding reference signal group, each sounding reference signal group of the at least one sounding reference signal group comprises sounding reference signal resources for a same analog beam and a same antenna panel, and the base unit is configured to determine any number of sounding reference signal resources from each sounding reference signal group.

10. The apparatus of claim 5, wherein the set of information for the second scheme comprises a number of panels and a number of panel groups.

11. The apparatus of claim 10, wherein the set of information for the second scheme comprises, in response to the type of beamforming comprising hybrid beamforming, information that indicates at least one sounding reference signal group, each sounding reference signal group of the at least one sounding reference signal group comprises sounding reference signal resources for a same analog beam and a same antenna panel, and the base unit is configured to determine any number of sounding reference signal resources from each sounding reference signal group.

12. The apparatus of claim 10, wherein the set of information for the second scheme comprises, in response to the type of beamforming comprising digital beamforming, information that indicates at least one sounding reference signal group, each sounding reference signal group of the at least one sounding reference signal group comprises sounding reference signal resources for a same antenna panel, and the base unit is configured to determine any number of sounding reference signal resources from each sounding reference signal group.

13. The apparatus of claim 10, wherein the set of information for the second scheme comprises information that indicates at least one sounding reference signal panel group, each sounding reference signal panel group of the at least one sounding reference signal panel group comprises at least one sounding reference signal group, and the base unit is configured to determine a maximum number of one sounding reference signal group from the at least one sounding reference signal group of each sounding reference signal panel group.

14. A method comprising:
receiving a set of information from a remote unit, wherein the set of information comprises a type of beamforming and corresponds to a grouping arrangement, and the type of beamforming comprises analog beamforming, digital beamforming, hybrid beamforming, or some combination thereof; and
receiving uplink data using a plurality of sounding reference signal ports, wherein reception power is shared by sounding reference signal ports from a same sounding reference signal group.

15. The method of claim 14, wherein the set of information comprises a number of sounding reference signal resources, a number of sounding reference signal groups, or some combination thereof.

16. The method of claim 15, wherein the number of sounding reference signal resources is greater than zero, the number of sounding reference signal groups is greater than zero, or some combination thereof.

17. An apparatus comprising:
a receiver that:
receives a set of information from a remote unit, wherein the set of information comprises a type of beamforming and corresponds to a grouping arrangement, and the type of beamforming comprises analog beamforming, digital beamforming, hybrid beamforming, or some combination thereof; and
receives uplink data using a plurality of sounding reference signal ports, wherein reception power is shared by sounding reference signal ports from a same sounding reference signal group.

18. The apparatus of claim 17, wherein the set of information corresponds to a codebook based uplink transmission scheme.

19. The apparatus of claim 17, wherein the set of information corresponds to a non-codebook based uplink transmission scheme.

* * * * *